United States Patent Office
3,687,816
Patented Aug. 29, 1972

3,687,816
BACTERIAL GROWTH MEDIA
Robert V. Marraro, Columbus, Ohio, assignor to the United States of America as represented by the Secretary of the Air Force
No Drawing. Filed June 17, 1970, Ser. No. 47,120
Int. Cl. C12k 1/06
U.S. Cl. 195—100
10 Claims

ABSTRACT OF THE DISCLOSURE

Culture media are provided that are specifically formulated to permit (1) the growth propagation, and maintenance of "cell wall defective" forms of microorganisms and (2) the induction of "cell wall defective" forms of microorganisms from their normal parent forms.

FIELD OF THE INVENTION

The invention relates to "cell wall defective" forms of microorganisms and a medium that permits the growth, propagation, and maintenance of such microorganisms. In one aspect it relates to a medium that permits the induction of "cell wall defective" forms of microorganisms from their normal parent forms.

BACKGROUND OF THE INVENTION

"Cell wall defective" forms of microorganisms can be defined as organisms that do not have normal physiologic, morphologic and bichemical cell wall constituents. Such organisms retain properties of their parent bacteria, particularly as regards their capacity to cause bacterial infections. Actually, treatment, as with antibiotics, that may be effective against the parent may be ineffective in combatting disease caused by the "cell wall defective" forms.

It appears that "cell wall defective" forms of microorganisms can be derived from most, if not all, species of bacteria, including particularly species of gram positive and gram negative cocci and bacilli. A principal problem facing the bacteriologist is to detect the presence of the organisms in a patient's system, as in the urinary tract, so that appropriate treatment may be initiated to overcome the resulting disease. In an article in "Journal of Clinical Investigation," vol. 44, pp. 1945–1952 (1965), L. Gutman et al. disclose a medium suitable for the growth of "cell wall defective" forms of microorganisms. The present invention in one of its aspects is concerned with an improved medium for the growth of such organisms.

OBJECTS OF THE INVENTION

It is an object of this invention to provide a medium for the growth, propagation, and maintenance of "cell wall defective" forms of microorganisms.

Another object of the invention is to provide a medium for the induction of "cell wall defective" forms of microorganisms from their normal parent forms.

A further object of the invention is to provide a method for detecting the presence of "cell wall defective" forms of microorganisms in a patient's system.

Still another object of the invention is to provide a method for preparing a bacterial growth medium particularly adapted to permit growth, propagation, and maintenance of "cell wall defective" forms of microorganisms.

A still further object of the invention is to provide a method for preparing a bacterial growth medium particularly adapted to permit the induction of "cell wall defective" forms of microorganisms from their normal parent forms.

Other and further objects and advantages of the invention will become apparent to those skilled in the art upon consideration of the accompanying disclosure.

DESCRIPTION OF THE INVENTION

In one embodiment, the present invention resides in a medium for the growth, propagation, and maintenance of "cell wall defective" forms of microorganisms. The medium is prepared by (1) mixing the following ingredients in the amounts indicated:

| | G. |
|---|---|
| Sucrose | 125 |
| Peptone | 15 |
| NaCl | 5 |
| $MgSO_4 \cdot 7H_2O$ | 3 |
| Yeast extract | 15 |
| Cholesterol (dissolved in 10 ml. of 95% ethanol) | 0.06 |
| Agar | 8 |
| Distilled water q.s. add 1 liter. | |

(2) adjusting the pH of the resulting solution to 7.8 by adding 1 N NaOH; (3) heating the solution in an autoclave for about 15 minutes at about 121° C. to ensure dissolution of the ingredients; (4) cooling the solution to a temperature above its gelation temperature, for example, to about 50° C.; (5) adding to the cooled solution 10 ml. of a sterile yeast concentrate and 200 ml. of human serum albumin; and (6) stirring until the added materials go into solution. Thereafter, measured quantities of the solution are poured into a suitable containers or plates, such as sterile Petri dishes, wherein the solution gels upon further cooling, forming the medium of this invention. It is to be understood that fractional amounts of the medium can be prepared by a corresponding adjustment of the amount of each component used in the formulation.

In the utilization of the medium, the possible source of "cell wall defective" forms of microorganisms, such as a specimen of urine, a blood sample or tissue fragments, are spread evenly on the medium in a Petri dish. The dish is then placed in a chamber wherein it is maintained in an anaerobic atmosphere at 37° C. The medium is observed daily for a prolonged period of time, e.g., for a total of 14 days, by means of light microscopy. If the microorganisms are present in the source, they will be visible in the medium, for example, as substantially circular forms of bacteria having a raised central portion. The bacteria can then be harvested for further identification procedures.

In another embodiment, the present invention resides in a medium for the induction of "cell wall defective" forms of microorganisms from their normal parent forms. The induction medium is identical to the growth medium prepared as described above except that 1000 units of a penicillin, preferably potassium penicillin G aqueous, is added for each milliliter of medium to be prepared. In the case where 1 liter of medium is prepared, $10^6$ units of penicillin are added, preferably along with the several ingredients added to distilled water.

In the utilization of the induction medium, a culture of a known species of bacteria is spread on the medium in a Petri dish. As described above with regard to the growth medium, the dish is then placed in a chamber where it is maintained at 37° C. in an anaerobic atmosphere for a prolonged period of time. As a result of the presence of penicillin in the medium, the parent bacterium is caused to change to its "cell wall defective" form. The "cell wall defective" form so prepared can be used for study purposes or as a control or basis of comparison with "cell wall defective" forms of microorganisms whose parent forms are unknown.

A more complete understanding of the invention can be obtained from a consideration of the following example which is not intended, however, to be unduly limitative of the invention.

EXAMPLE

The bacterial growth medium of this invention was prepared by dissolving the below listed ingredients in distilled water. The amount of distilled water used was a quantity sufficient to give 1 liter of solution.

|  | G. |
|---|---|
| Sucrose | 125 |
| Phytone [1] | 15 |
| NaCl | 5 |
| $MgSO_4 \cdot 7H_2O$ | 3 |
| Yeast extract | 15 |
| Cholesterol (dissolved in 10 ml. of 95% ethanol) | 0.06 |
| Ionagar No. 2 [2] | 8 |
| Distilled water q.s. add 1 liter. | |

[1] A trademark of Baltimore Biological Laboratories for peptone (bacteriological media).
[2] A refined agar manufactured by Colab Laboratories Inc., Chicago Heights, Ill.

After adjusting the pH of the solution to 7.8 by adding 1 N NaOH, the solution was autoclaved for 15 minutes at 121° C. The solution was then allowed to cool to 50° C., and 10 ml. of Bacto Supplement B and 200 ml. of human serum albumin were added. [Bacto Supplement B is a sterile yeast concentrate sold by Difco Laboratories Inc., Detroit, Mich. and described in Difco Manual, 9th ed., p. 276 (1953)]. The solution was stirred until the added materials were dissolved. Thereafter, 8 ml. portions of the solution were poured into 60 x 15 mm. plastic Petri dishes. Upon cooling to room temperature, the solution in the dishes gelled, thereby forming the medium of this invention.

An 0.5 ml. sample of a specimen of urine was placed on the medium in one of the Petri dishes and spread evenly over its surface. The dish was then placed in a Gaspak anaerobic jar (Baltimore Biological Laboratories) at 37° C. The specimen was observed daily for a total of 14 days, utilizing light microscopy (100×). During this period the growth of "cell wall defective" forms of microorganisms were morphologically noted. At the end of the period, the bacteria were harvested for further identification procedures.

The specially designed microbiological media of this invention can be utilized in microbiology laboratories on a research level as well as on a clinical level. On the clinical level, they will aid greatly in the treatment of patients with specific disease syndromes in which bacteria previously could not be recovered. On a research level, they will be of great assistance in furthering an understanding of those peculiar microorganisms which are "cell wall defective" and capable of causing pathogenesis in man. However, while the bacterial growth medium has been described with relation to the growth and recovery of "cell wall defective" microorganisms, it should be understood that it can be used as the growth medium for normal bacteria.

It is to be understood that some slight variations may be made in the preferred medium formulations disclosed herein without departing from the spirit and scope of the invention.

I claim:
1. A method for preparing a bacterial growth medium adapted to permit growth, propagation, and maintenance of "cell wall defective" forms of microorganisms, said method comprising the following steps:
   (a) dissolving in distilled water the following ingredients in the amounts indicated, the amount of distilled water being sufficient to provide 1 liter of solution:

|  | G. |
|---|---|
| Sucrose | 125 |
| Peptone | 15 |
| NaCl | 5 |
| $MgSO_4 \cdot 7H_2O$ | 3 |
| Yeast extract | 15 |
| Cholesterol (dissolved in 10 ml. of 95% ethanol) | 0.06 |
| Agar | 8 |

(b) adjusting the pH of the resulting solution to 7.8;
   (c) heating said solution for about 15 minutes at about 121° C.;
   (d) cooling said solution to a temperature above its gelation temperature;
   (e) adding to said cooled solution 10 ml. of a sterile yeast concentrate and 200 ml. of human serum albumin;
   (f) stirring said solution containing said added materials until said added materials go into solution; and
   (g) cooling measured amounts of the resulting solution to at least its gelation temperature, thereby forming said medium.

2. A method according to claim 1 in which the pH is adjusted by adding 1 N NaOH to said solution.

3. A method according to claim 1 in which said solution is cooled after the heating step to a temperature of about 50° C.

4. A method according to claim 1 in which said measured amounts of solution are cooled to about room temperature.

5. A method for preparing a bacterial growth medium adapted to permit the induction of "cell wall defective" forms of microorganisms from their normal parent forms, said method comprising the following steps;
   (a) dissolving in distilled water the following ingredients in the amounts indicated, the amount of distilled water being sufficient to provide 1 liter of solution:

Sucrose—125 g.
Peptone—15 g.
NaCl—5 g.
$MgSO_4 \cdot 7H_2O$—3 g.
Yeast extract—15 g.
Cholestrol (dissolved in 10 ml. of 95% ethanol)—0.06 g.
Agar—8 g.
Penicillin—$10^6$ units;

(b) adjusting the pH of the resulting solution to 7.8;
   (c) heating said solution for about 15 minutes at about 121° C.;
   (d) cooling said solution to a temperature above its gelation temperature;
   (e) adding to said cooled solution 10 ml. of a sterile yeast concentrate and 200 ml. of human serum albumin;
   (f) stirring said solution containing said added materials until said added materials go into solution; and
   (g) cooling measured amounts of the resulting solution to at least its gelation temperature, thereby forming said medium.

6. A method according to claim 5 in which the pH is adjusted by adding 1 N NaOH to said solution.

7. A method according to claim 5 in which said solution is cooled after the heating step to a temperature of about 50° C.

8. A method according to claim 5 in which said measured amounts of solution are cooled to about room temperature.

9. A bacterial growth medium prepared according to the method of claim 1.

10. A bacterial growth medium prepared according to the method of claim 5.

References Cited

Gutman et al.: Journal of Clinical Investigation, vol. 44, No. 12, pp. 1945–1952 (1965).

ALVIN E. TANENHOLTZ, Primary Examiner

U.S. Cl. X.R.

195—96